United States Patent
Romero et al.

(10) Patent No.: US 8,261,156 B2
(45) Date of Patent: Sep. 4, 2012

(54) METHODS AND APPARATUSES FOR CORRECTING ERRORS IN DATA STREAMS

(75) Inventors: Gabriel L. Romero, Colorado Springs, CO (US); Frederick G. Smith, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 1028 days.

(21) Appl. No.: 12/208,578

(22) Filed: Sep. 11, 2008

(65) Prior Publication Data

US 2010/0064192 A1    Mar. 11, 2010

(51) Int. Cl.
  *H03M 13/00* (2006.01)
(52) U.S. Cl. ........................ 714/758; 702/189
(58) Field of Classification Search .................. 714/758; 702/189
  See application file for complete search history.

(56) References Cited

U.S. PATENT DOCUMENTS

| | | | |
|---|---|---|---|
| 6,980,543 B1 * | 12/2005 | Kastenholz et al. | 370/352 |
| 7,558,326 B1 * | 7/2009 | Lyle et al. | 375/244 |
| 2007/0189619 A1 * | 8/2007 | Liu et al. | 382/237 |
| 2007/0294572 A1 * | 12/2007 | Kalwitz et al. | 714/9 |

* cited by examiner

*Primary Examiner* — Guy Lamarre
*Assistant Examiner* — SunSurraye Westbrook
(74) *Attorney, Agent, or Firm* — Duft Bornsen & Fishman LLP

(57) ABSTRACT

Methods and apparatuses for correcting an error in a data stream that is coded with a line code and an error detection scheme. Information relating to the line code is used to locate at least one possible error character. At least one possible correct character to replace one or more of the at least one possible error character is then identified. Subsequently, the error detection scheme is applied to the data stream updated with one of the at least one possible correct character. If none of the at least one possible correct character results in a valid data stream, an error that is observable by a user is generated.

20 Claims, 8 Drawing Sheets

METHODS AND APPARATUSES FOR CORRECTING ERRORS IN DATA STREAMS

BACKGROUND

1. Field of the Invention

The invention relates generally to data streams and more specifically relates to correcting errors in data streams coded with a line code and an error detection scheme.

2. Discussion of Related Art

Certain data streams, especially high speed data streams including those of a storage system, are often transmitted without an accompanying clock signal. Instead, a receiver generates a clock based on transitions in a data stream. In order for the receiver to generate the clock, the data stream must include sufficient transitions. To ensure there are sufficient transitions, the serial data stream is often encoded into a line code that is chosen for transmission purposes. For example, a line code chosen for a Serial Attached Small Computer System Interface ("SAS") data stream is the 8B10B coding scheme. Many details of the SAS family of standards may be found at www.t10.org.

The 8B10B coding scheme provides that each 8-bit data byte is encoded into a 10-bit character. The 10-bit character is transmitted instead of the 8-bit data byte. Because not all 10-bit combinations are used to represent all possible 8-bit data bytes, some 10-bit combinations are invalid 8B10B characters. A valid 8B10B character can include five 0's and five 1's, four 0's and six 1's, or six 0's and four 1's. Each 8-bit data byte is encoded into one of two 10-bit 8B10B characters; one character is transmitted when the running disparity is positive and another character is transmitted when the running disparity is negative.

A positive running disparity roughly means that one more 1's have been transmitted than the number of transmitted 0's, and a negative running disparity roughly means that one more 0's have been transmitted than the number of transmitted 1's. Running disparity is a concept used in the 8B10B coding scheme to keep the number of transmitted 0's and 1's roughly equal; the running disparity may be changed depending on the 8B10B character (or subblocks of the character) that is transmitted. For example, if the running disparity is already positive (i.e., roughly one more 1's have been transmitted than 0's), a character (or subblocks of the character) cannot cause the running disparity to further become positive (i.e., causing the number of transmitted 0's and 1's to become even more unequal). Instead, the character needs to either maintain the running disparity as positive (i.e., roughly one more 1's remains to have been transmitted than 0's), or cause the running disparity to become negative (roughly one more 0's have been transmitted than 1's).

Meanwhile, transmission of the serial data stream inevitably results in bit errors. Although information relating to the 8B10B coding scheme may be used to detect certain errors in encoded 10-bit 8B10B characters, a scheme designed specifically to detect data errors is often used. Additionally, the data stream may be arranged as a series of data frames, and the data detection scheme is applied to each data frame. For example, a SAS data frame includes a cyclic redundancy check ("CRC") value to help detect errors in decoded 8-bit data bytes of a data frame. The CRC value is a result of a computation that resembles a long division operation on the data frame.

As data streams are being transmitted at high speeds, there is a corresponding high likelihood for encountering data errors. For example, even if a single-bit error is only expected for every trillion bits that are transmitted, at a transmission speed of three gigabits per second, a bit error is expected in less than ten minutes. The transmission error is typically reported to a host computer and becomes observable by a user. The host computer would typically attempt to correct the error through retransmission, but it slows down the overall transmission speed. The transmission error, although usually correctable after the retransmission, also causes some users to think the system is unreliable even though the error should be expected given the high transmission speed. These issues become even more critical as speed increases—such as SAS soon adopting 12 gigabits per second speed.

Thus it is an ongoing challenge to reduce the number of errors that need to be reported to the host computer in communication using line coding including 8B10B.

SUMMARY

The present invention solves the above and other problems, thereby advancing the state of the useful arts, by providing methods and systems for correcting an error in a data stream. The data stream is coded with a line code and an error detection scheme. Information relating to the line code is used to locate at least one possible error character. At least one possible correct character to replace one or more of the at least one possible error character is then identified. Subsequently, the error detection scheme is applied to the data stream updated with one of the at least one possible correct character. Accordingly, information relating to the line code, in conjunction with the error detection scheme, can be used to correct certain errors in the data stream if the data stream has been corrected with an identified possible correct character. Because some errors can be corrected, the number of errors that need to be reported to the host computer (e.g., to be corrected by the host computer through retransmission) can be reduced.

In one aspect hereof, a method is provided for correcting an error in a data stream, the data stream being coded with a line code and an error detection scheme. The method comprises locating at least one possible error character based on information relating to the line code and identifying at least one possible correct character to replace one or more of the at least one possible error character. The method also comprises applying the error detection scheme to the data stream updated with one of the at least one possible correct character, and generating an error observable by a user if none of the at least one possible correct character results in a valid data steam.

In another aspect hereof, an apparatus is provided for correcting an error in a data stream, the data stream being coded with a line code and an error detection scheme. The apparatus comprises a locating element for locating at least one possible error character based on information relating to the line code and an identifying element for identifying at least one possible correct character to replace one or more of the at least one possible error character. The apparatus also comprises an applying element for applying the error detection scheme to the data stream updated with one of the at least one possible correct character. Additionally, the apparatus comprises a generating element for generating an error observable by a user if none of the at least one possible correct character results in a valid data steam.

In yet another aspect hereof, a computer readable medium having instructions is provided for performing a method to correct an error in a data stream in accordance with the method described above.

DETAILED DESCRIPTION OF THE DRAWINGS

Figure 1:
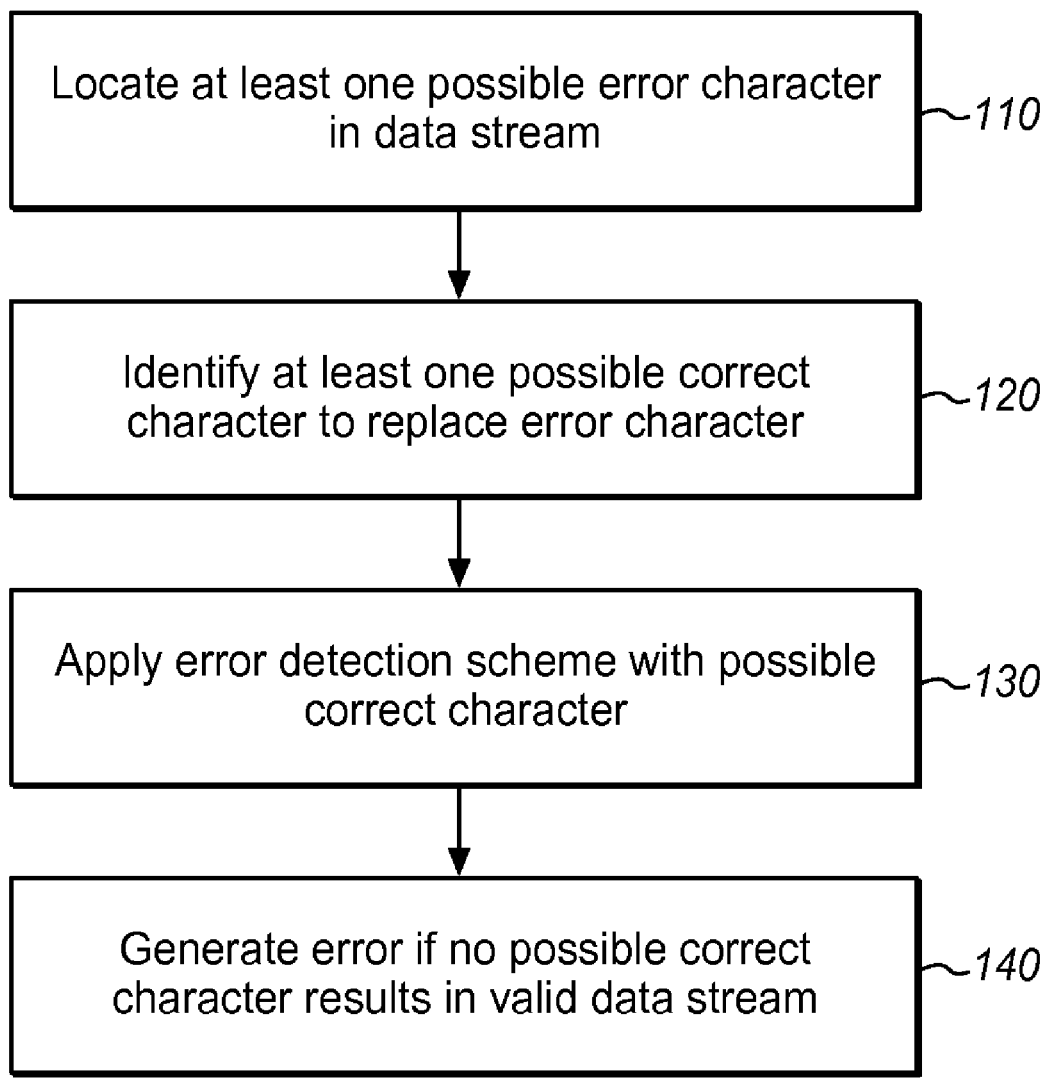
FIG. 1 is a flowchart describing an exemplary method in accordance with features and aspects hereof to correct an error in a data stream.

FIG. 1 is a flowchart describing an exemplary method in accordance with features and aspects hereof to correct an error in a data stream. The data stream is coded with a line code and an error detection scheme. Information relating to the line code can be used by a receiver of the data stream to determine that an error has occurred in the received data stream. At step 110, the receiver locates at least one possible error character in the data stream based on information relating to the line code. At step 120, the receiver then identifies at least one possible correct character to replace one or more of the at least one possible error character. For example, when the receiver receives a character of the data stream, the receiver may determine that an error has occurred with the current character. The receiver may then locate a preceding character or the current character of the data stream as possibly in error. The receiver may identify at least one possible correct character to correct the preceding character. The receiver may also identify other possible correct characters to correct the current character.

At step 130, the receiver applies the error detection scheme to the data stream updated with one of the at least one possible correct character. For example, the receiver may apply the error detection scheme to the data stream in which the preceding character has been replaced with a first possible correct character. Alternatively or in addition, the receiver may apply the error detection scheme to the data stream in which the preceding character has been replaced with a second possible correct character. Alternatively or in addition, the receiver may apply the error detection scheme to the data stream in which the current character has been replaced with a third possible correct character.

As noted above, the data stream may be arranged as a series of data frames, and the error detection scheme is applied to each data frame. It will be understood that applying the error detection scheme to the data stream may involve decoding characters of a particular data frame and applying the error detection scheme to decoded characters of the particular data frame. It will also be understood that the receiver may apply the error detection scheme serially or in parallel depending on available resources as will be described in greater detail in FIGS. 3 and 4. Additionally, the receiver may apply the error detection scheme to the updated data stream while the receiver is still receiving characters of a particular data frame, or after the particular data frame has been received.

As a result of applying the error detection scheme to the updated data stream, the receiver may determine that the updated data stream is valid. If so, the updated data stream may have a high likelihood of being a correct data stream that a transmitter originally intended to transmit to the receiver. Based on the likelihood, the receiver may determine whether the data stream has been corrected. However, if no possible correct character results in a valid data stream, the receiver generates an error so the error is observable by a user at step 140. For example, the receiver may generate the error to a driver of a host computer, and the driver in turn passes the error to an operating system of the host computer to handle the error.

Figure 2:
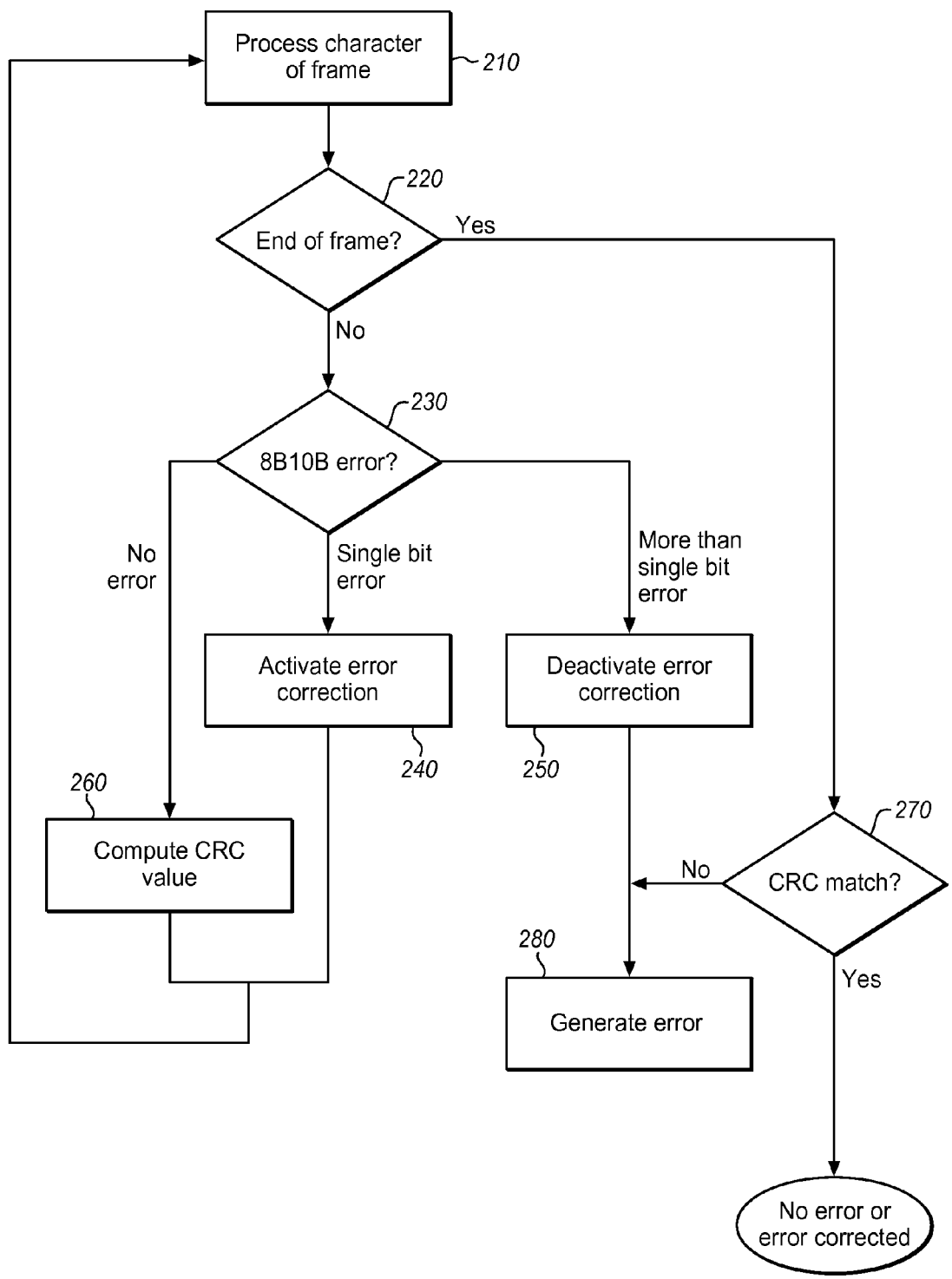
FIG. 2 is a flowchart describing an exemplary method in accordance with features and aspects hereof to correct an error in a data stream coded with the 8B10B coding scheme.

FIG. 2 is a flowchart describing an exemplary method in accordance with features and aspects hereof to correct an error in a data stream coded with the 8B10B coding scheme. The data stream includes a series of data frames each coded with the CRC error detection scheme. For example, a SAS data frame follows a special "start of frame" character, ends with a character for a CRC value transmitted from a transmitter, and is followed by a special "end of frame" character. As the receiver receives characters of the data stream, the receiver processes characters of a data frame at step 210 one character at a time.

At step 220, the receiver determines whether the end of frame has been reached. If not, the receiver proceeds to step 230 to determine if the character being processed indicates an 8B10B error. For example, the character may not be a valid 8B10B character and/or the character violates 8B10B running disparity rules. If the end of frame has been reached, the receiver proceeds to step 270 to determine whether a computed CRC value matches the CRC value transmitted from the transmitter. A data frame that results in matching CRC values is likely a correct data frame that the transmitter originally intended to transmit to the receiver. For example, if no error correction scheme has been applied to the data frame, and the CRC values match each other, the unmodified data frame is likely valid. Alternatively, if an error correction scheme has been applied to the data frame, and the computed CRC value of a particular data frame that has been updated with a particular possible correct character matches the CRC value transmitted from the transmitter, the particular data frame is likely valid as corrected. Accordingly, if the CRC values match each other, either there is no error or an error has been corrected. Otherwise, there is an error that cannot be corrected, and the receiver generates an error so the error is observable by a user at step 280.

Several outcomes can result from step 230 that determines if the character being processed indicates an 8B10B error. The receiver may determine that there is no error, there is a single-bit error, or two or more bits are in error. If there is no error, the receiver computes at step 260 a CRC value that accounts for the character being processed. As noted above, the receiver may decode the 10-bit 8B10B character into a decoded 8-bit data byte before applying CRC to account for the character being processed. If there is a single-bit error, the receiver activates an error correction mechanism at step 240 to attempt to correct the single bit error as will be explained in greater detail. The receiver returns to step 210 to process a next character after either step 260 or 240.

If two or more bits are in error, the receiver may decide that the error is not correctable with the error detection mechanism. For example, if the receiver receives three characters in a row and each character causes the running disparity to change from positive to negative, then at least two bits are in error. As another example, if the receiver receives a character with eight 1's and two 0's, then at least two bits are also in error. If the error is not correctable, the receiver deactivates the error detection mechanism at step 250 if the error detection mechanism has been activated previously. For example, if the receiver has already computed multiple CRC values for multiple possible correct data streams because the receiver had originally identified a possible single-bit error, the CRC values need not be kept and/or certain circuitry or resources can be deactivated or released. Because the error is not correctable, the receiver generates an error at step 280 so the error is observable by a user.

Figure 3:
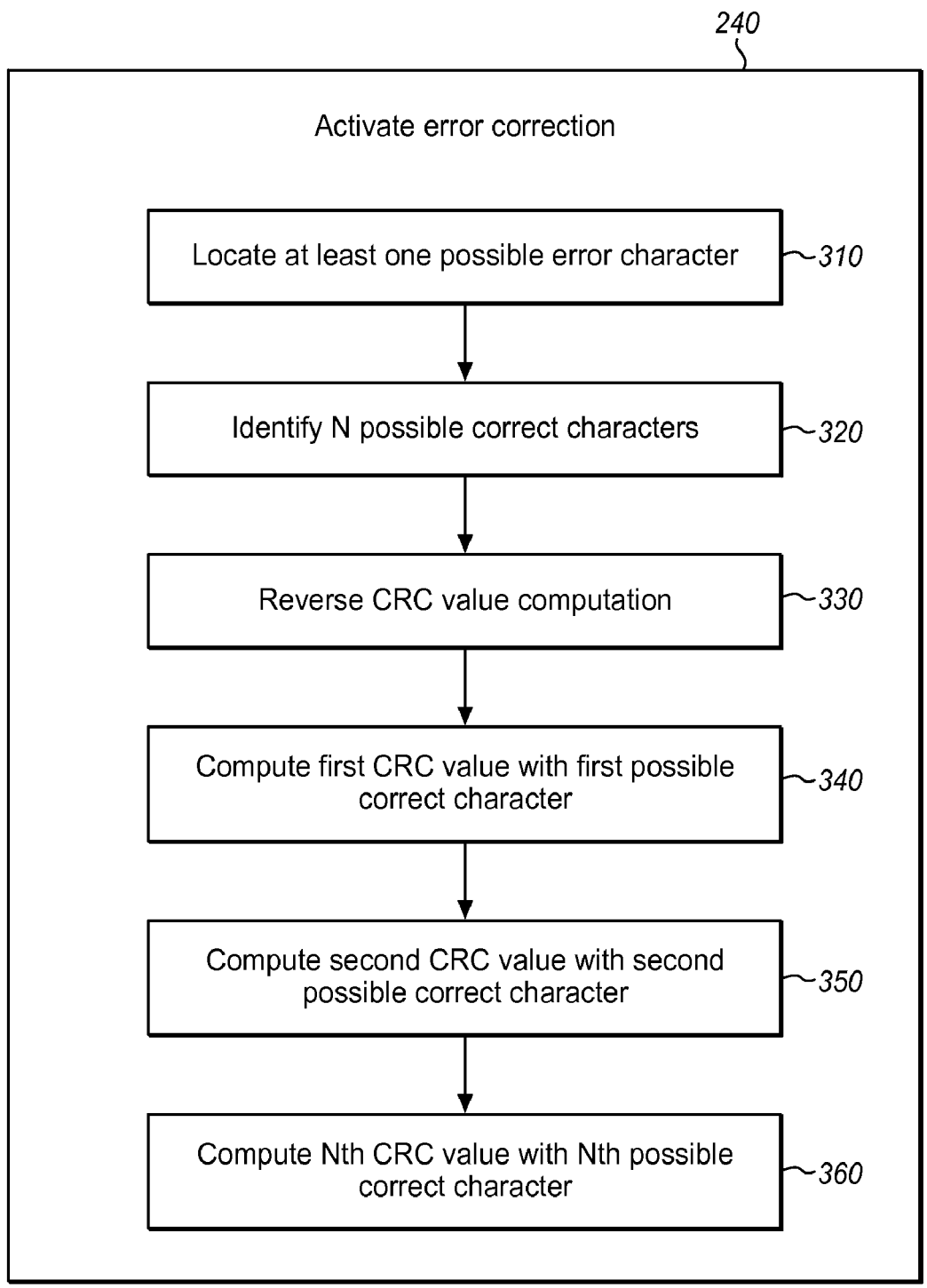
FIG. 3 is a flowchart describing exemplary additional details to activate error correction in accordance with features and aspects hereof.

FIG. 3 is a flowchart describing exemplary additional details of step 240 in FIG. 2 to activate the error correction scheme in accordance with features and aspects hereof. At step 310, the receiver locates at least one possible error character with the single-bit error as will be explained in greater detail. For example, suppose that running disparity is positive, and the receiver receives a first character that causes the running disparity to become negative followed by a second character that causes the running disparity to further become negative. The receiver would decide that there is likely a single-bit error when the receiver processes the second character. The receiver would then locate either the first character or the second character as being possibly an error character.

At step 320, the receiver identifies up to "N" possible correct characters. For example, the receiver may decide that either the first character should have maintained the running disparity positive so that the first character should have an equal number of 0's and 1's (i.e., disparity neutral), or the second characters should have maintained the running disparity negative (assuming the first character intended to change the running disparity negative) so that the second character should be disparity neutral. As a more specific example, the first character may be 010001 0101, which would cause the running disparity to become negative. For the character to be disparity neutral, the receiver would "flip" one of the 0's to a 1. This would imply that any of 110001 0101, 011001 0101, 010101 0101, 010011 0101, 010001 1101, or 010001 0111 could have been transmitted by the receiver. However, some of the six possibilities may not be a valid character in 8B10B encoding, thus may be eliminated as a possibility. One possibility eliminated may be 010001 0111 because it is not a valid data character even though it is a valid control character. The second character may be 010010 0101, and among its six possibilities, one possibility eliminated may be 010010 0111 because it is not a valid 8B10B character. Accordingly, in this more specific example, the receiver could identify a total of ten possible correct characters.

At step 330, the receiver reverses the CRC value computation so that the CRC computation can account for the identified possible correct characters. For example, a CRC value that accounts for the first character may have already been computed. The CRC value is reversed so it does not account for the first character because it may be in error. As noted above, the CRC value is a result of a computation that resembles a long division operation. The CRC value may be reversed by any of several known methods. For example, the long division-like operation may be reversed through a multiplication-like operation. Earlier computed CRC values may be temporarily stored so an earlier value may be restored. The CRC value may also be recomputed from the beginning of the frame if all characters of the frame are stored in a temporary buffer. In SAS standards, this temporary buffer is usually called an elasticity buffer. It will be understood that the CRC computation can account for the identified possible correct characters as will be explained in greater detail by using a pointer to point to one of the identified possible correct characters also stored in the temporary buffer.

At step 340, the receiver computes a first CRC value with a first possible correct character. For example, the receiver may compute a first CRC value with a first possible correct character 110001 0101 and the second character 010010 0101. At step 350, the receiver computes a second CRC value with a second possible correct character. At step 360, the receiver computes Nth CRC value with Nth possible correct character. For example, one of the N CRC values computed may be with the first character 010001 0101 and a possible correct character 110010 0101 for the second character. It is noted that the CRC value that accounts for the first character may have already been computed as noted above, and the existing CRC value computation (without it being reversed) can continue to account for the possible correct character 110010 0101.

Figure 4:
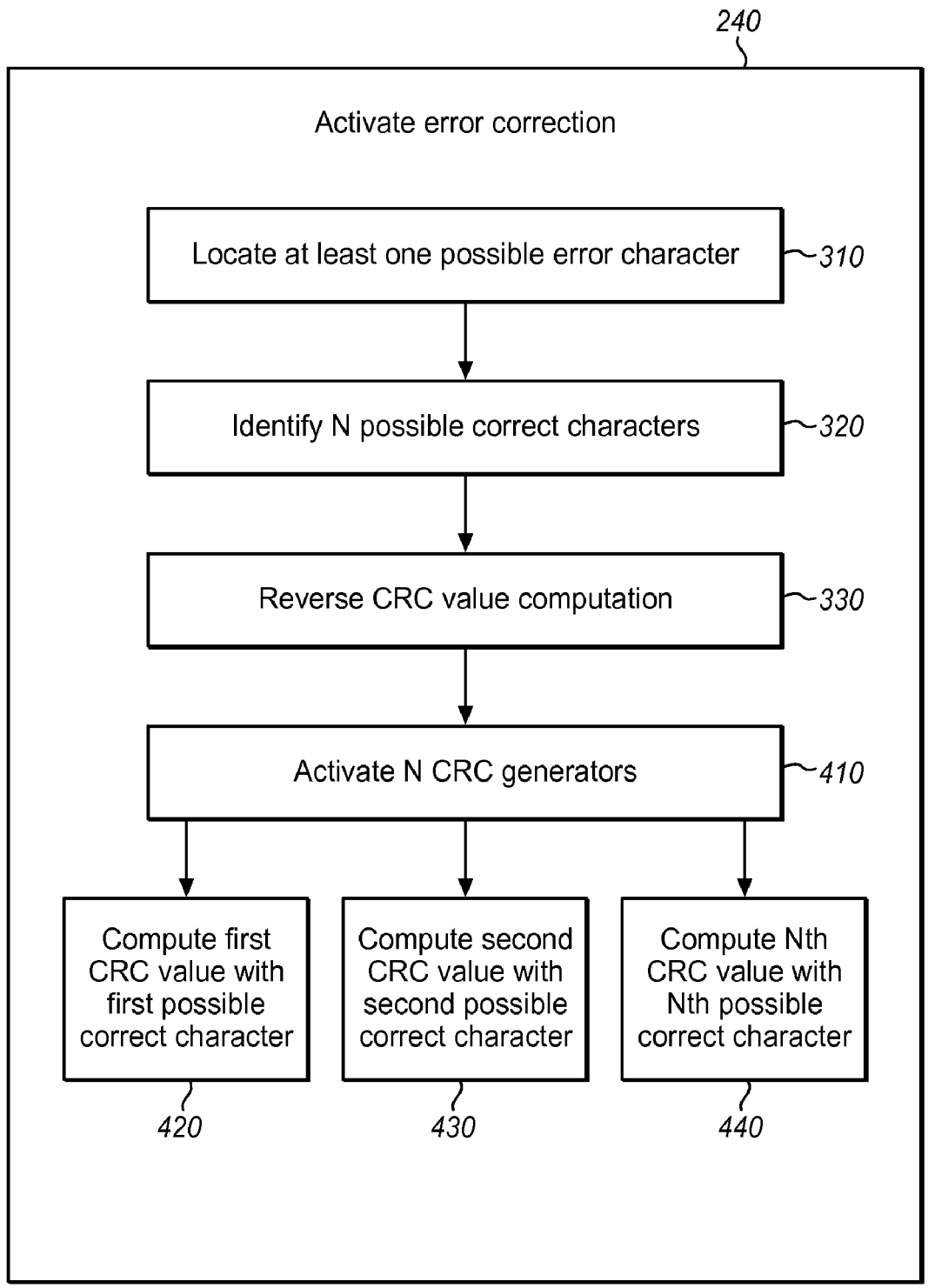
FIG. 4 is a flowchart describing alternative exemplary details to activate error correction in accordance with features and aspects hereof.

FIG. 4 is a flowchart describing alternative exemplary additional details of step 240 in FIG. 2 to activate the error correction scheme in accordance with features and aspects hereof. The receiver also locates at least one possible error character at step 310, identifies up to "N" possible correct characters at step 320, and reverses the CRC value computation at step 330. At step 410, the receiver activates N CRC generators so that CRC values can be computed in parallel. The existing CRC value computation (without it being reversed) and the reversed CRC value can be applied to several CRC generators as a starting point for CRC value computation. For example, the reversed CRC value can be applied to five CRC generators that need to compute five CRC values when the first character replaced with its five possible correct characters. The existing CRC value computation (without it being reversed because it already accounts for the first character) can be applied to another five CRC generators that need to compute another five CRC values when the second character is replaced with its five possible correct characters. At step 420, the receiver computes a first CRC value with a first possible correct character using a first CRC generator. At step 430 and substantially simultaneously as step 420, the receiver computes a second CRC value with a second possible correct character using a second CRC generator. At step 440 and substantially simultaneously as step 430, the receiver computes Nth CRC value with Nth possible correct character using Nth CRC generator.

It will be understood that alternatively, multiple CRC generators may be activated when the CRC value is computed from the beginning from a data frame, and each CRC generator is reversed to then account for each possible correct character. In this alternative, the multiple CRC generators may be computing the same value before the error correction scheme is activated, but the CRC generators need not be activated at step 410. It will also be understood that in some instances, not all possible correct characters are considered. For example, there may be ten possible correct characters, but there are only five CRC generators. The receiver may decide by itself and/or base on user configuration that only five CRC values are computed to consider five of the ten possible correct characters using the five CRC generators. If the actual correct character happens to be one of the remaining five possible correct characters not considered, then the error cannot be corrected.

Figure 5:
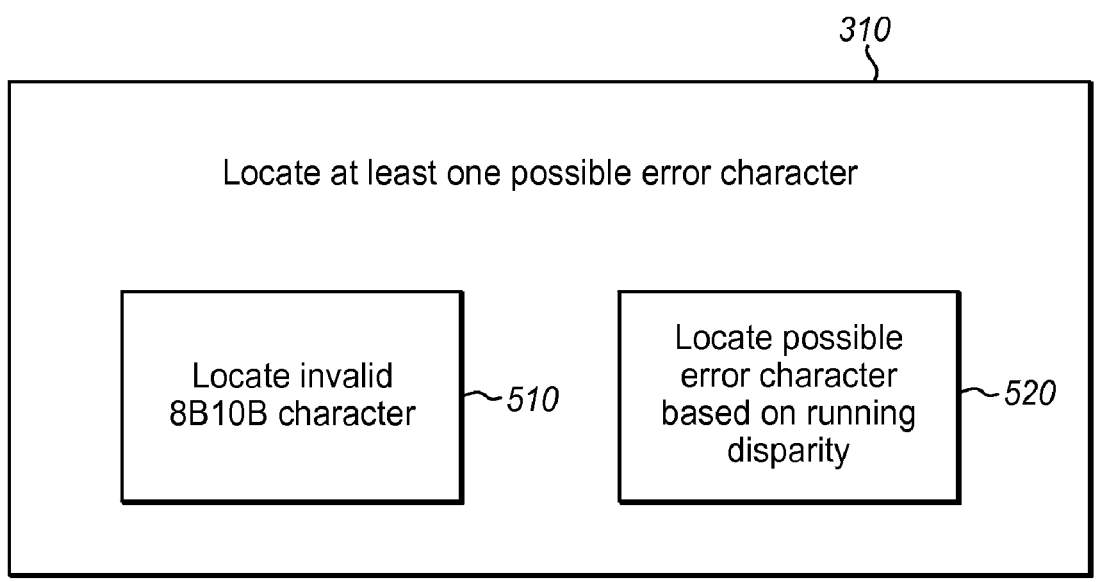
FIG. 5 is a flowchart describing alternative exemplary details to locate at least one possible error character in accordance with features and aspects hereof.

FIG. 5 is a flowchart describing exemplary additional details of step 310 in FIGS. 3 and 4 to locate at least one possible error character in accordance with features and aspects hereof. In view of the SAS standards and the 8B10B coding scheme, FIG. 5 provides more specificity in locating at least one possible error character. At step 510, the receiver attempts to locate an invalid 8B10B character. For example, the receiver may receive a character with seven 1's and three 0's. The receiver would attempt to flip one of the seven 1's to a 0 so that there are six 1's and four 0's. Some of the seven possibilities may not be valid characters, and may be eliminated as possibilities. Another way to locate at least one possible error character is based on running disparity at step 520. As an example in addition to the one explained above with respect to step 310, suppose the running disparity is negative, and the receiver receives a first character that causes the running disparity to become positive followed by a second character that causes the running disparity to further become positive. The receiver would locate either the first character or the second character as possibly an error character and should be disparity neutral.

As another example, suppose that running disparity is positive, and the receiver receives a first character that causes the running disparity to become negative, followed by at least one interim character that is disparity neutral, which is followed by a second character that causes the running disparity to further become negative. The receiver would locate the first character or the second character as possibly an error character and should be disparity neutral, or any interim character that is disparity neutral is possibly an error character and should cause the running disparity to become positive. As yet another example, suppose that running disparity is negative, and the receiver receives a first character that causes the running disparity to become positive, followed by at least one interim character that is disparity neutral, which is followed by a second character that causes the running disparity to further become positive. The receiver would locate the first character or the second character as possibly an error character and should be disparity neutral, or any interim character that is disparity neutral is possibly an error character and should cause the running disparity to become negative. As noted above, the receiver may decide by itself and/or base on user configuration that fewer CRC values are computed because not all possible correct characters are considered. Accordingly, possible correct characters for the at least one interim character that is disparity neutral may not be considered if there are too many possibilities.

It is also noted that the receiver may look for additional characters and decide that there are in fact two or more bits in error, and the error is not correctable. For example, following the example above in which the running disparity has become positive still, if the receiver receives a third character that causes the running disparity to become positive, two or more bits are in error. However, if the receiver does not receive any more characters of the frame (other than the ending CRC value), or receives zero or more characters that are disparity neutral, or receives zero or more characters that are disparity neutral followed by a character that causes the running disparity to become positive, then the error may be limited to a single-bit error. Accordingly, it will be understood that in some instances, the receiver may check additional characters before activating the error detection scheme that corrects a single-bit error but not errors in two or more bits.

Figure 6:
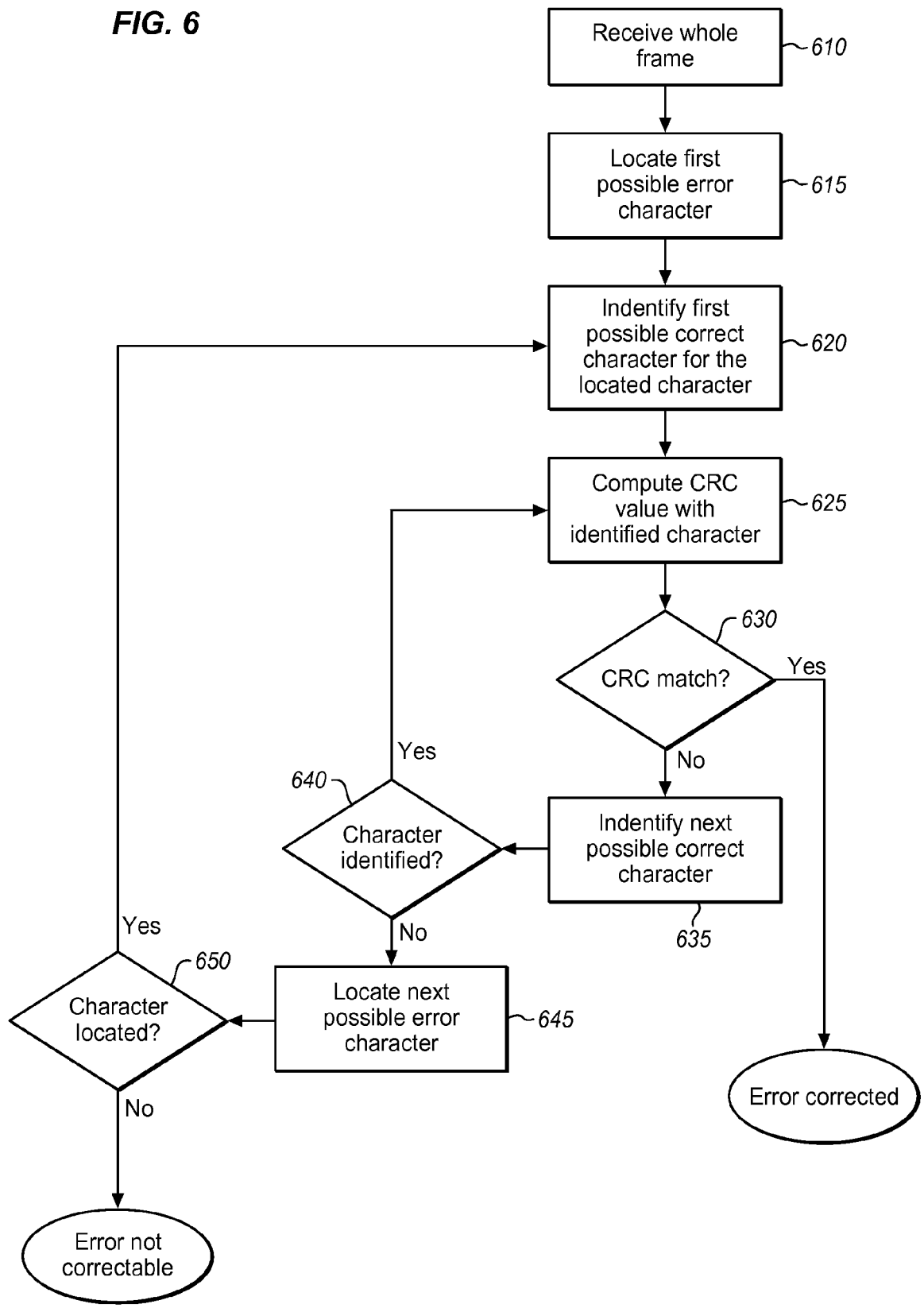
FIG. 6 is a flowchart describing another exemplary method in accordance with features and aspects hereof to correct an error in a data stream.

FIG. 6 is a flowchart describing another exemplary method in accordance with features and aspects hereof to correct an error in a data stream. At step 610, the receiver receives a whole data frame. For example, this exemplary method may be implemented by a driver of a host computer that receives a whole data frame after a host bus adapter has received the whole data frame. This exemplary method may also be implemented as a resource that is used by a receiver after the receiver has finished receiving a whole data frame. Additionally, the resource may be shared by multiple receivers one at a time. Step 615 locates a first possible error character similar to step 310 of FIG. 3. Step 620 identifies a first possible correct character to replace the first possible error character. Step 625 computes a CRC value of the data stream that has been replaced with the first possible correct character. At step 630, if the computed CRC value matches the CRC value transmitted from the transmitter, then the error has been corrected with the first possible correct character.

If the CRC values do not match, step 635 attempts to identify a next possible correct character. If the next possible correct character can be identified at step 640, the method returns to step 625 to compute a CRC value of the data stream that has been replaced with the next possible correct character. If the next possible correct character cannot be identified, step 645 attempts to locate a next possible error character. If the next possible error character can be located at step 650, the method returns to step 620 to identify a first possible correct character to replace the next possible error character. If the next possible error character cannot be located, then the error is not correctable.

Those of ordinary skill in the art will readily recognize numerous additional and equivalent steps that may be performed and/or omitted in the methods of FIGS. 1 through 6. Such additional and equivalent steps are omitted herein merely for brevity and simplicity of this discussion.

Various design choices and heuristics may be added to simplify implementation and/or to improve performance. For example, the receiver may look up possible correct characters from a lookup table in which characters are ranked by their likelihood for correcting an error. The lookup table can allow a user or a designer to modify the rankings. Accordingly, the receiver may apply the error detection scheme (e.g., computing CRC value) on a first data stream that has been updated with a character that has a higher possibility for correcting the data stream than a second data stream that has been updated with another character. The receiver may also decide by itself and/or base on user configuration that a character less likely to correct the error is not considered.

Alternatively and/or in addition to using the lookup table, due to the effect of electrical rise and fall time, the receiver may apply the error detection scheme (e.g., computing CRC value) to a first data stream before a second data stream based on a number of consecutive bits of a same value. As an example, for a possible error character 011111 0100, a first data stream having a first possible correct character 011110 0100 is more likely to correct the possible error character than a second data stream having a second possible correct character 010111 0100. It is noted that there are four consecutive 1's preceding the flipped 0 in the first possible correct character 011110 0100, and there is one 1 preceding the flipped 0 in the second possible correct character 010111 0100. Accordingly, the receiver may apply the error detection scheme to a first data stream before a second data stream, the first data stream having a first flipped bit and the second data stream having a second flipped bit, such that more consecutive bits of a same value immediately precede the first flipped bit than the second flipped bit.

Figure 7:
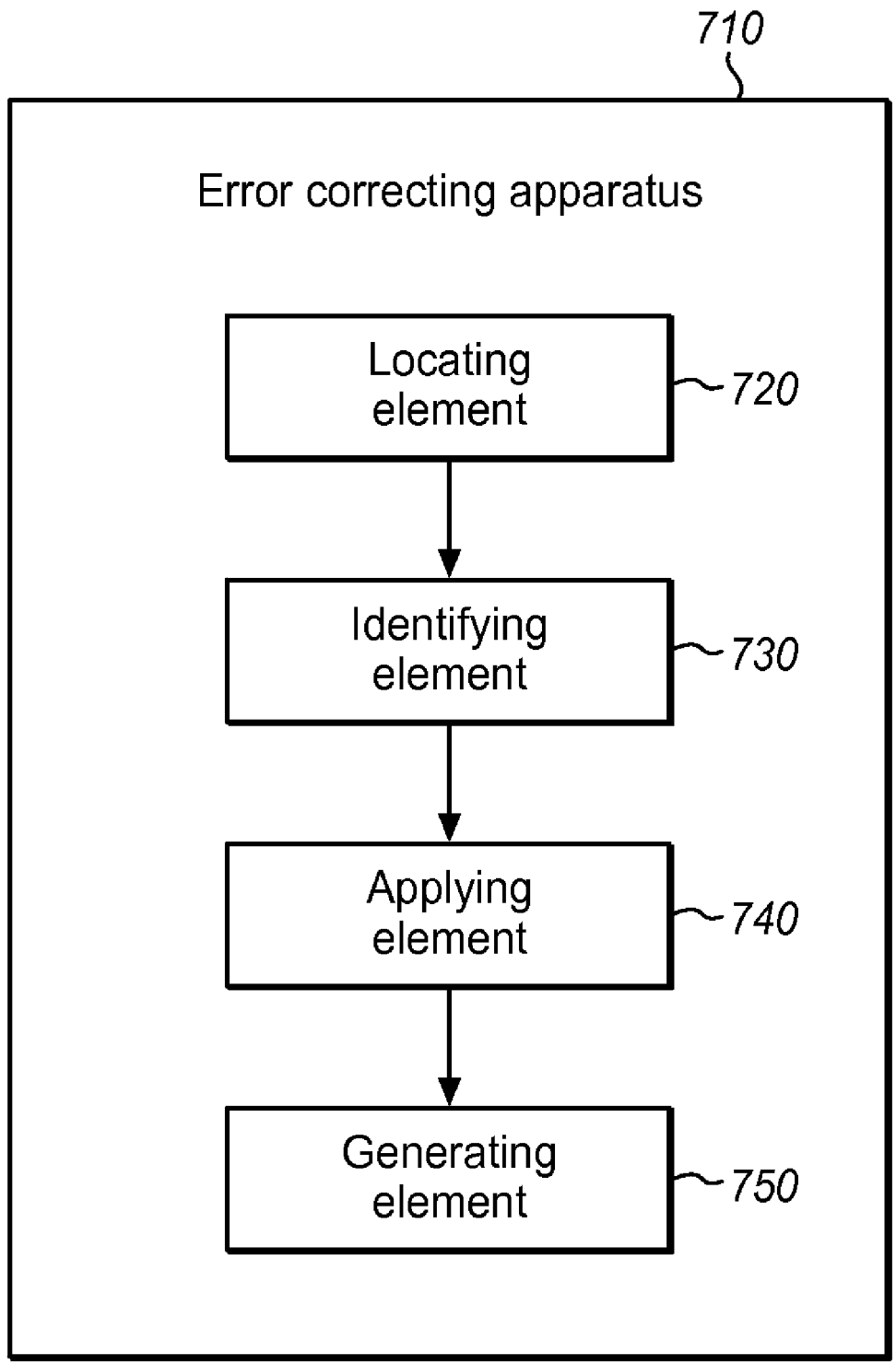
FIG. 7 is a block diagram of an exemplary apparatus in accordance with features and aspects hereof to correct an error in a data stream.

FIG. 7 is a block diagram of an exemplary apparatus in accordance with features and aspects hereof to correct an error in a data stream. The error correcting apparatus 710 may be part of a SAS expander, part of a SAS port, and/or part of host bus adapter, etc. Those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice.

The error correcting apparatus 710 comprises a locating element 720 for locating at least one possible error character based on information relating to the line code. The error correcting apparatus 710 also comprises an identifying element 730 for identifying at least one possible correct character to replace one or more of the at least one possible error character, and an applying element 740 for applying the error detection scheme to the data stream updated with one of the at least one possible correct character. Additionally, the error correcting apparatus 710 comprises a generating element 750 for generating an error observable by a user if none of the at least one possible correct character results in a valid data steam. Those of ordinary skill in the art will readily recognize numerous additional and/or equivalent components and modules within FIG. 7. Such additional and/or equivalent components are omitted herein for simplicity and brevity of this discussion.

Figure 8:
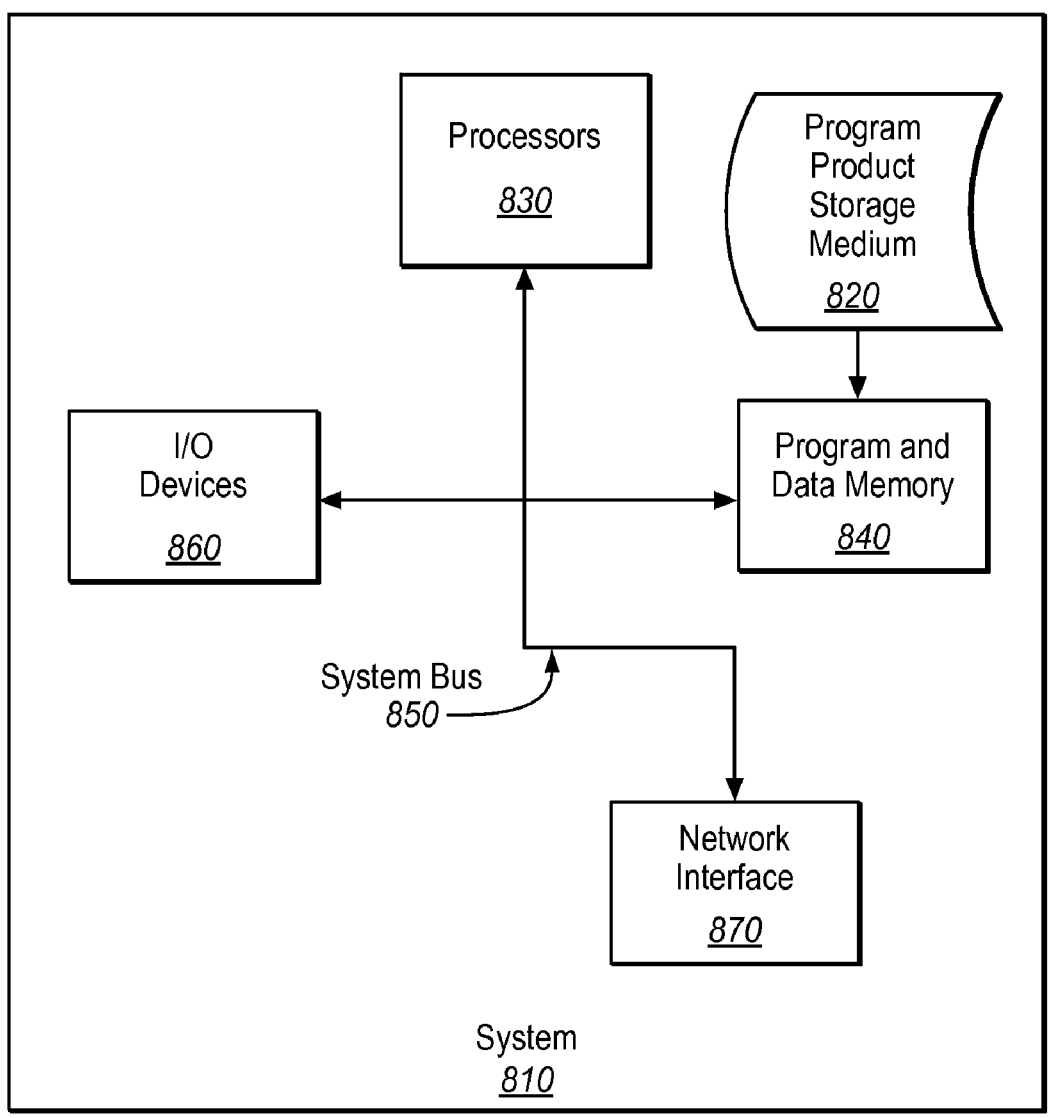
FIG. 8 is a block diagram of an exemplary system/device including storage of a program product that may embody methods and processes hereof.

Embodiments of the methods discussed above can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 is a block diagram depicting a system 810 adapted to provide features and aspects hereof by executing programmed instructions and accessing data stored on a computer readable storage medium 820.

Furthermore, embodiments of the methods discussed above can take the form of a computer program product accessible from a computer-usable or computer readable medium 820 providing program code for use by or in connection with a computer or any instruction execution system. For the purposes of this description, a computer-usable or computer readable medium can comprise any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 830 coupled directly or indirectly to memory elements 840 through a system bus 850. The memory elements can include local memory employed during actual execution of the program code, bulk storage, and cache memories which provide temporary storage of at least some program code in order to reduce the number of times code must be retrieved from bulk storage during execution.

Input/output or I/O devices 860 (including but not limited to keyboards, displays, pointing devices, etc.) can be coupled to the system either directly or through intervening I/O controllers. Network adapter interfaces 870 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

It will be recognized that besides SAS, the 8B10B coding scheme is used in technologies including Peripheral Component Interconnect ("PCI") Express, Serial Advanced Technology Attachment ("SATA"), Fibre Channel, and various Gigabit Ethernet standards, among others. Those of ordinary skill in the art will further recognize that features and aspects hereof may also be applied to a line coding other than 8B10B. For example, features and aspects hereof could be applied to 10B12B as the SAS standards evolve to incorporate that encoding. Thus the above discussion with respect to 8B10B example is intended merely as exemplary embodiments.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for correcting an error in a data stream, the data stream being coded with a line code and an error detection scheme, the method comprising:
   locating at least one possible error character anywhere in the data stream based on information relating to the line code;
   identifying at least one possible correct character to replace one or more of the at least one possible error character;
   applying the error detection scheme to the data stream updated with one of the at least one possible correct character; and
   generating an error observable by a user if none of the at least one possible correct character results in a valid data steam.

2. The method of claim 1, wherein the data stream is a Serial Attached Small Computer System Interface ("SAS") data stream.

3. The method of claim 1, wherein the error detection scheme is cyclic redundancy check ("CRC").

4. The method of claim 1, wherein the line code is 8B10B.

5. The method of claim 4, wherein the step of locating comprises:
   locating the at least one possible error character based on 8B10B running disparity.

6. The method of claim 1, wherein the step of locating comprises:
   locating an invalid character of the line code.

7. The method of claim 1, wherein the step of identifying comprises identifying the at least one possible correct character by flipping one bit of the one or more of the at least one possible error character and eliminating any invalid character of the line code.

8. The method of claim 1, wherein the step of applying comprises applying the error detection scheme to a plurality of data streams in parallel, wherein each of the plurality of data streams has been updated with a respective possible correct character.

9. The method of claim 1, wherein the step of applying comprises applying the error detection scheme to a first updated data stream before a second updated data stream, the first updated data stream having a first character with a higher possibility for correcting the data stream than a second character of the second data stream, the method further comprising looking up the first character and the second character from a lookup table.

10. The method of claim 1, wherein the step of applying comprises applying the error detection scheme to a first data stream before a second data stream, the first data stream having a first flipped bit and the second data stream having a second flipped bit, wherein more consecutive bits of a same value immediately precede the first flipped bit than the second flipped bit.

11. A communications receiver for correcting an error in a received data stream, the data stream being coded with a line code and an error detection scheme, the apparatus comprising:
- a locating element for locating at least one possible error character anywhere in the data stream based on information relating to the line code;
- an identifying element for identifying at least one possible correct character to replace one or more of the at least one possible error character;
- an applying element for applying the error detection scheme to the data stream updated with one of the at least one possible correct character; and
- a generating element for generating an error observable by a user if none of the at least one possible correct character results in a valid data steam.

12. The receiver of claim 11, wherein the data stream is a Serial Attached Small Computer System Interface ("SAS") data stream.

13. The receiver of claim 11, wherein the error detection scheme is cyclic redundancy check ("CRC") and wherein the line code is 8B10B.

14. The receiver of claim 13, wherein the locating element is adapted to:
- locate an invalid 8B10B character; and
- locate the at least one possible error character based on 8B10B running disparity.

15. The receiver of claim 11, wherein the identifying element is adapted to identify the at least one possible correct character by flipping one bit of the one or more of the at least one possible error character and eliminating any invalid character of the line code.

16. The receiver of claim 11, wherein the applying element is adapted to apply the error detection scheme to a plurality of data streams in parallel, wherein each of the plurality of data streams has been updated with a respective possible correct character.

17. The receiver of claim 11, wherein the applying element is adapted to apply the error detection scheme to a first updated data stream before a second updated data stream, the first updated data stream having a first character with a higher possibility for correcting the data stream than a second character of the second data stream, the method further comprising looking up the first character and the second character from a lookup table.

18. The receiver of claim 11, wherein the applying element is adapted to apply the error detection scheme to a first data stream before a second data stream, the first data stream having a first flipped bit and the second data stream having a second flipped bit, wherein more consecutive bits of a same value immediately precede the first flipped bit than the second flipped bit.

19. A non-transitory computer readable medium having instructions for performing a method to correct an error in a data stream, the data stream being coded with a line code and an error detection scheme, the method comprising:
- locating at least one possible error character anywhere in the data stream based on 8B10B information;
- identifying at least one possible correct character to replace one or more of the at least one possible error character;
- applying the error detection scheme to the data stream updated with one of the at least one possible correct character; and
- generating an error observable by a user if none of the at least one possible correct character results in a valid data steam.

20. The computer readable medium of claim 19, wherein the data stream is a Serial Attached Small Computer System Interface ("SAS") data stream and wherein the error detection scheme is cyclic redundancy check ("CRC").

* * * * *